(12) United States Patent
Crispin et al.

(10) Patent No.: US 9,807,383 B2
(45) Date of Patent: Oct. 31, 2017

(54) WEARABLE VIDEO HEADSET AND METHOD FOR CALIBRATION

(71) Applicant: DAQRI, LLC, Los Angeles, CA (US)

(72) Inventors: Sterling Crispin, Los Angeles, CA (US); Mark Anthony Sararu, Los Angeles, CA (US)

(73) Assignee: DAQRI, LLC, Los Angeles, CA (US)

( * ) Notice: Subject to any disclaimer, the term of this patent is extended or adjusted under 35 U.S.C. 154(b) by 30 days.

(21) Appl. No.: 15/085,084

(22) Filed: Mar. 30, 2016

(65) Prior Publication Data

US 2017/0289535 A1 Oct. 5, 2017

(51) Int. Cl.
*H04N 17/00* (2006.01)
*G02B 27/01* (2006.01)
*G06T 19/00* (2011.01)

(52) U.S. Cl.
CPC ......... *H04N 17/004* (2013.01); *G02B 27/017* (2013.01); *G02B 27/0179* (2013.01); *G02B 2027/0181* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 2,114,060 A | * | 4/1938 | Oakley | G03B 35/00 351/203 |
| 4,836,670 A | * | 6/1989 | Hutchinson | A61B 3/113 351/210 |
| 4,950,069 A | * | 8/1990 | Hutchinson | A61B 3/113 351/210 |
| 4,973,149 A | * | 11/1990 | Hutchinson | A61B 3/113 351/210 |
| 5,016,282 A | * | 5/1991 | Tomono | G06F 3/013 382/117 |
| 5,471,542 A | * | 11/1995 | Ragland | A61B 3/113 351/208 |
| 5,481,622 A | * | 1/1996 | Gerhardt | A61B 3/113 345/158 |
| 5,953,117 A | * | 9/1999 | Kooi | A61B 3/024 356/256 |
| 6,578,962 B1 | * | 6/2003 | Amir | G06K 9/0061 345/157 |
| 6,943,754 B2 | * | 9/2005 | Aughey | A61B 3/113 345/7 |

(Continued)

*Primary Examiner* — Joseph Haley
*Assistant Examiner* — Karin Kiyabu
(74) *Attorney, Agent, or Firm* — Schwegman Lundberg & Woessner, P.A.

(57) ABSTRACT

During calibration, a wearable video headset displays a pattern on a partially transparent display positioned in a field of view of a user's eye. The user has a hand-held marker that includes a scaled version of the displayed pattern. The user moves the marker toward or away from the user's eye until the pattern on the marker appears to be the same size as the pattern on the display. When the sizes match, the headset measures a distance between a forward-facing camera and the hand-held marker. The headset uses the measured distance, and geometrical relationships, to determine the spacing between the user's eye and the display. Such calibration can ensure that the images displayed to the user mesh realistically with the surroundings, which remain partially visible through the partially transparent display of the video headset.

16 Claims, 5 Drawing Sheets

(56) References Cited

U.S. PATENT DOCUMENTS

| | | | | |
|---|---|---|---|---|
| 7,519,218 B2* | 4/2009 | Takemoto | G02B 27/017 | 382/165 |
| 7,809,160 B2* | 10/2010 | Vertegaal | A61B 3/113 | 345/157 |
| 8,077,914 B1* | 12/2011 | Kaplan | A61B 3/113 | 351/209 |
| 8,457,352 B2* | 6/2013 | Hennessey | A61B 3/113 | 382/103 |
| 8,487,838 B2* | 7/2013 | Lewis | A61B 3/113 | 345/8 |
| 8,696,121 B1* | 4/2014 | Fram | G06F 3/013 | 351/200 |
| 8,820,931 B2* | 9/2014 | Walsh | A61B 3/102 | 351/206 |
| 8,824,779 B1* | 9/2014 | Smyth | G06K 9/0061 | 382/100 |
| 8,830,304 B2* | 9/2014 | Miyatani | H04N 13/0239 | 348/115 |
| 8,885,882 B1* | 11/2014 | Yin | G06F 3/00 | 382/103 |
| 9,213,405 B2* | 12/2015 | Perez | H04N 21/25891 | |
| 9,244,529 B2* | 1/2016 | Model | G06F 3/013 | |
| 9,311,527 B1* | 4/2016 | Yin | G06F 3/00 | |
| 9,323,325 B2* | 4/2016 | Perez | H04N 13/0278 | |
| 2002/0094189 A1* | 7/2002 | Navab | H04N 19/27 | 348/207.99 |
| 2004/0061831 A1* | 4/2004 | Aughey | A61B 3/113 | 351/209 |
| 2005/0234333 A1* | 10/2005 | Takemoto | G02B 27/017 | 600/426 |
| 2006/0110008 A1* | 5/2006 | Vertegaal | G06K 9/00604 | 382/103 |
| 2006/0119794 A1* | 6/2006 | Hillis | G02B 3/14 | 351/205 |
| 2008/0292131 A1* | 11/2008 | Takemoto | G06T 7/80 | 382/100 |
| 2010/0013949 A1* | 1/2010 | Miyamoto | A61B 3/113 | 348/222.1 |
| 2010/0295924 A1* | 11/2010 | Miyatani | H04N 13/0239 | 348/46 |
| 2012/0236257 A1* | 9/2012 | Hillis | A61B 5/04001 | 351/205 |
| 2013/0083976 A1* | 4/2013 | Ragland | G06F 3/011 | 382/117 |
| 2014/0232871 A1* | 8/2014 | Kriel | H04N 5/2259 | 348/148 |
| 2016/0049009 A1* | 2/2016 | Hara | G06K 9/00671 | 345/633 |
| 2016/0210503 A1* | 7/2016 | Yin | G06F 3/00 | |
| 2017/0123492 A1* | 5/2017 | Marggraff | G06F 3/0304 | |

* cited by examiner

$$\frac{FI + ID}{XDISP} = \frac{FI + ID + DC + CM}{XMARK}$$

FIG. 8

$$ID = (DC + CM)\left(\frac{1}{\frac{XMARK}{XDISP} - 1}\right) - FI$$

WEARABLE VIDEO HEADSET AND METHOD FOR CALIBRATION

TECHNICAL FIELD

The subject matter disclosed herein generally relates to calibrating an eye-to-display distance of a wearable video headset.

BACKGROUND

A wearable video headset can produce images and display the images near the eyes of a user. In some examples, the video headset can include a partially transparent display. It is generally desirable to calibrate the video headset, so that the images displayed to the user mesh realistically with the surroundings, which remain partially visible through the partially transparent display of the video headset.

BRIEF DESCRIPTION OF THE DRAWINGS

Some embodiments are illustrated by way of example and not limitation in the figures of the accompanying drawings.

DETAILED DESCRIPTION

During calibration, a wearable video headset displays a pattern on a partially transparent display positioned in a field of view of a user's eye. The user has a hand-held marker that includes a scaled version of the displayed pattern. The user moves the marker toward or away from the user's eye until the pattern on the marker appears to be the same size as the pattern on the display. When the sizes match, the headset measures a distance between a forward-facing camera and the hand-held marker. The headset uses the measured distance, and geometrical relationships, to determine the spacing between the user's eye and the display. Such calibration can ensure that the images displayed to the user mesh realistically with the surroundings, which remain partially visible through the partially transparent display of the video headset.

Figure 1:
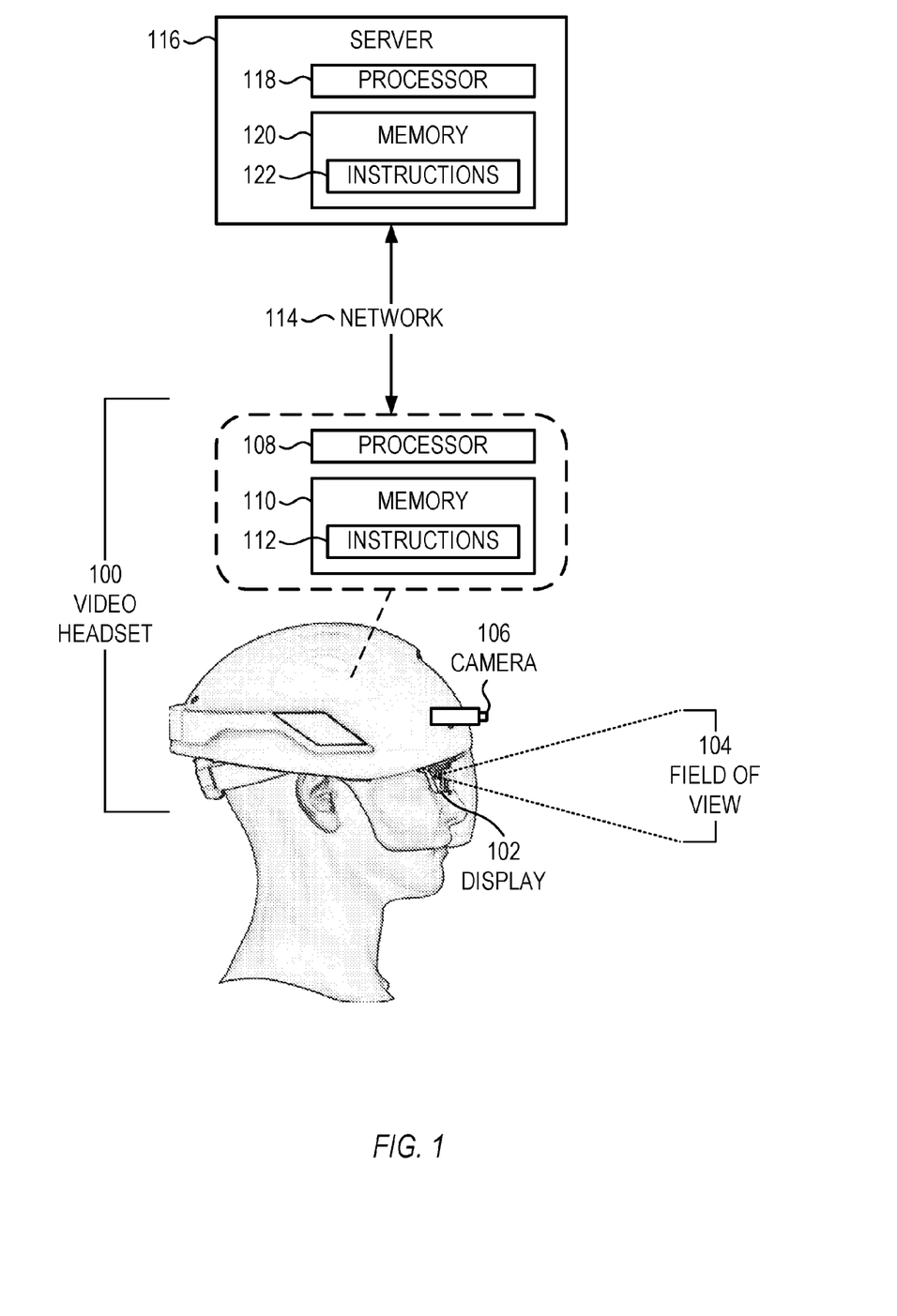
FIG. 1 is a block diagram showing an example of a video headset wearable on a head of a user, in accordance with some embodiments.

FIG. 1 is a block diagram showing an example of a video headset 100 wearable on a head of a user, in accordance with some embodiments. The configuration of FIG. 1 is but one example of a video headset 100; other suitable configurations can also be used.

The video headset 100 can include a display 102. The display 102 can be at least partially transparent and positioned in a field of view 104 of an eye of the user. The calibration procedure discussed below uses the principle that as an object moves farther away from the eye of the user, the object occupies a decreasing fraction of the field of view 104, and therefore appears smaller to the user. The field of view 104 is shown in cross-section in FIG. 1 as expanding linearly from a fovea of an eye of the user.

The video headset 100 can include a forward-facing camera 106 fixedly attached to the video headset 100. During use of the video headset 100, the forward-facing camera 106 can capture video images of the user's surroundings, including most or all of the field of view 104 of the user. The video headset 100 can optionally augment the video images to include relevant data, such as captions or labels, and/or highlight particular elements, such as people or other noteworthy objects. The video headset 100 can display the relevant data and/or highlights. In some examples, the video headset 100 relies on the partial transparency of the display 102 to allow the user to see the user's surroundings. In other examples, the video headset 100 overlays the relevant data and/or highlights onto the video images to generate augmented video images, and displays the augmented video images on the display 102.

The video headset 100 can include a processor 108 and memory 110 including instructions 112 that, when executed on the processor 108, cause the processor 108 to perform operations. In some examples, the processor 108 can render visualizations of the relevant data and/or highlights, or visualizations of augmented video images, for presentation on the display 102. In some examples, the processor 108 and memory 110 are coupled to storage on a computer-readable medium (not shown). In some other examples, the processor 118 generates augmented content data based on the video images captured by the forward-facing camera 106. The server 116 provides the augmented content data to the video headset 100 via the network 114.

In some examples, the video headset 100 can connect via a network 114 to one or more servers 116. Each server 116 can include a processor 118 and memory 120 including instructions 122 that, when executed on the processor 118, cause the processor 118 to perform operations. In some examples, the processor 118 can access additional information through the Internet, and/or can perform calculations more intensive than can be handled by the processor 108 in the video headset 100. In some examples, the processor 118 and memory 120 are coupled to storage on a computer-readable medium (not shown).

Figure 2:
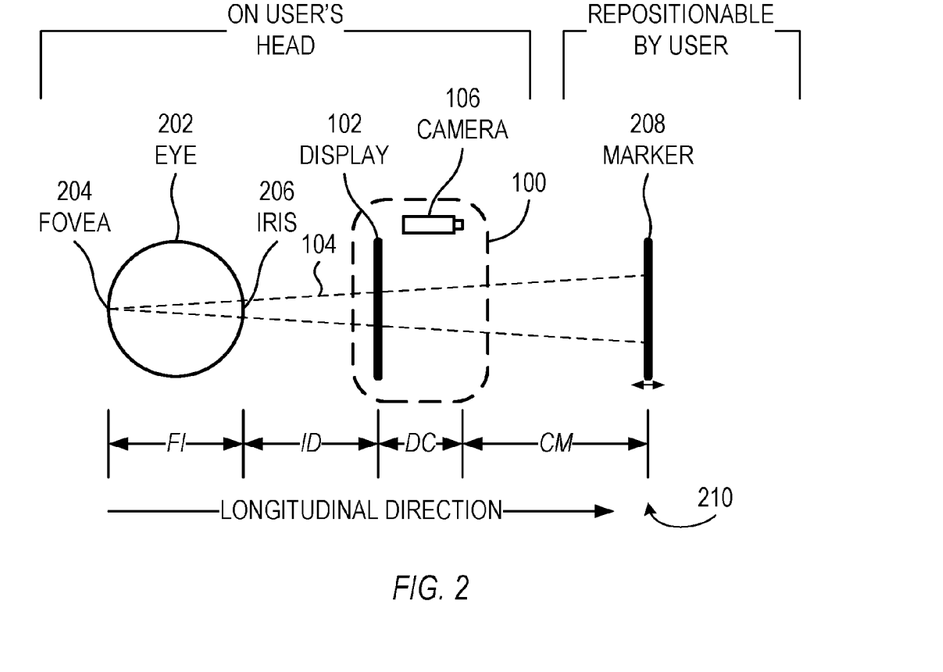
FIG. 2 is a block diagram showing an example of the optical system of the video headset of FIG. 1, in accordance with some embodiments.

FIG. 2 is a block diagram showing an example of the optical system of the video headset 100 of FIG. 1, in accordance with some embodiments. The elements shown in FIG. 2 are but one example of elements that can be used in a video headset; other configurations can also be used.

The optical system of the video headset 100 of FIG. 1 includes a user's eye 202 and its associated elements, and the video headset 100 and its associated elements. Both the eye 202 and the video headset 100 are positioned on a user's head during use, and elements associated with the eye the eye 202 and the video headset 100 remain stationary with respect to one another during use of the video headset 100.

The eye 202 includes a fovea 204 at a rear of the eye 202, and an iris 206 at a front of the eye 202. The field of view 104 appears to originate at the fovea 204. In other words, if one were to trace the edges of the field of view 104 (e.g., the dashed lines in FIGS. 1 and 2) backwards into the eye, the edges would converge to a point at the fovea 204.

A marker 208 can include a pattern, such as an array of shaded squares, which can be a scaled version of a pattern displayed on the display 102 during calibration. The marker 208 can be a printed element, made from a generally rigid but non-breakable material, such has a cardboard or plastic. Alternatively, the marker 208 can use a reconfigurable screen that displays the pattern at a specified size.

A user can manually position the marker 208 at a selectable distance away from the user's eye 202. As the user moves the marker 208 closer to the eye 202, the pattern on the marker occupies a larger portion of the field of view 104 and therefore appears larger to the user. Similarly, as the user moves the marker 208 away from the eye 202, the pattern on the marker occupies a smaller portion of the field of view 104 and therefore appears smaller to the user. Movement closer to and away from the eye 202 is along a longitudinal direction, as shown in FIG. 2.

During calibration, the user positions the marker 208 in the field of view of the eye at a first longitudinal position 210 away from the video headset 100, such that when the marker 208 is positioned at the first longitudinal position 210, a pattern on the marker 208 appears to be the same size as a pattern on the display 102 in the field of view 104 of the eye 202.

Figure 3:
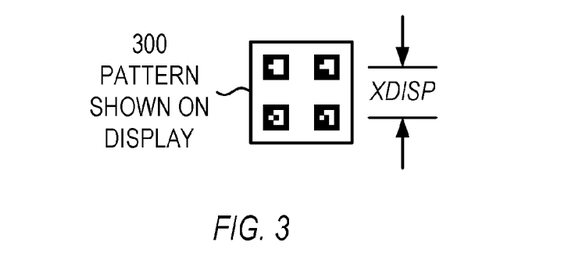
FIG. 3 shows an example of a pattern shown on the display of the video headset of FIG. 1 during calibration of the video headset of FIG. 1, in accordance with some embodiments.

FIG. 3 shows an example of a pattern 300 shown on the display 102 of the video headset 100 of FIG. 1 during calibration of the video headset of FIG. 1, in accordance with some embodiments. In some examples, the pattern is a two-dimensional pattern on a surface normal to an axis along the field of view of the eye. In some examples, the pattern includes at least one two-dimensional fiducial marker. The pattern 300 on the display 102 is sized with a relative size XDISP along one dimension.

Figure 4:
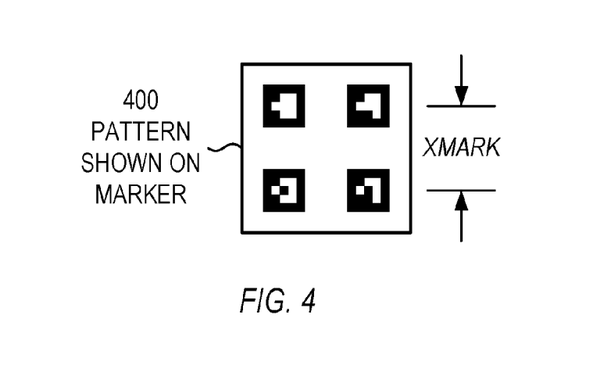
FIG. 4 shows an example of a pattern shown on the marker during calibration of the video headset of FIG. 1, in accordance with some embodiments.

FIG. 4 shows an example of a pattern 400 shown on the marker 202 during calibration of the video headset of FIG. 1, in accordance with some embodiments. The pattern 400 on the marker 202 can be a scaled version of the pattern 300 on the display 102. The pattern 400 on the marker is sized with a relative size XMARK, where XDISP and XMARK are expressed in the same unit of measure (e.g., mm) and describe the same features in the patterns 300 and 400 along the same dimension.

Returning to FIG. 2, FIG. 2 labels various longitudinal distances between adjacent elements. Each of these distances is explained below.

Distance FI is a longitudinal spacing between the fovea 204 of the eye 202 and an iris 206 of the eye 202. In practice, it is found that there is little variation from adult-to-adult for distance FI. Therefore, distance FI can be selected to equal 24 mm, which corresponds to an average diameter of a human eyeball.

Distance ID is a longitudinal spacing between the iris 206 of the eye 202 and the display 102. The calibration procedures solves for this distance ID.

Distance DC is a longitudinal spacing between the display 102 and the forward-facing camera 106. Distance DC is known for a given video headset 100, and can be determined just once for a particular unit (rather than measured or determined each time a calibration is performed), from a computer-aided design (CAD) drawing of the video headset 100 and/or measurement of a manufactured unit.

Distance CM is a longitudinal spacing between the camera 106 and the marker 202, when the pattern on the marker 202 appears to be the same size as the pattern on the display 102 in the field of view 104 of the eye 202. Distance CM is a measured quantity for each calibration.

The calibration routine discussed below measures distance CM each time calibration is performed, uses specified values for distances FI and DC (e.g., not measured or calculated each time calibration is performed), uses specified values for sizes XDISP and XMARK (also not measured or calculated each time calibration is performed), and calculates distance ID.

Figure 5:
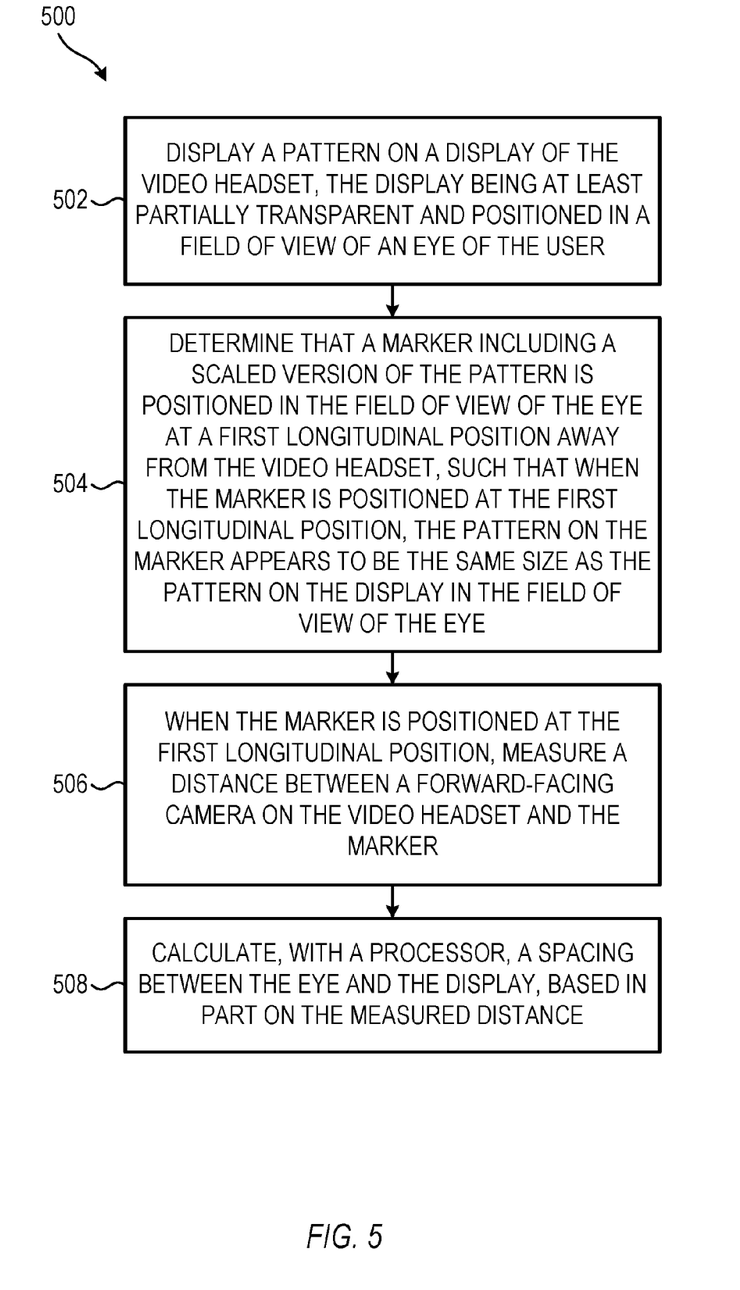
FIG. 5 is a flow chart showing an example of a method for calibrating a video headset worn on a head of a user, in accordance with some embodiments.

FIG. 5 is a flow chart showing an example of a method 500 for calibrating a video headset worn on a head of a user, in accordance with some embodiments. The method 500 can be executed on the video headset 100 of FIG. 1, or on other suitable video headsets. The method 500 of FIG. 5 is but one example of a method for calibrating a video headset; other suitable calibration methods can also be used.

At operation 502, the video headset can display a pattern on a display of the video headset. The display can be at least partially transparent and positioned in a field of view of an eye of the user.

At operation 504, the video headset can determine that a marker including a scaled version of the pattern is positioned in the field of view of the eye at a first longitudinal position away from the video headset, such that when the marker is positioned at the first longitudinal position, the pattern on the marker appears to be the same size as the pattern on the display in the field of view of the eye.

In some examples of operation 504, the user can manually move the marker toward and/or away from the video headset, a forward-facing camera on the video headset can generate video images of the marker at various distances away from the video headset, the video headset can automatically determine from the video images of the marker when the marker is positioned at the first longitudinal position (e.g., when the pattern on the marker appears to be the same size as the pattern on the display), and the video headset can automatically measure the distance from the camera to the marker when the marker is at the first longitudinal position. For these examples, determining that the marker is positioned at a first longitudinal position can include automatically sensing with the forward-facing camera that the pattern on the marker in the field of view of the eye is sized to match the pattern on the display in the field of view of the eye to within a specified threshold.

In other examples of operation 504, the user can manually move the marker toward and/or away from the video headset, the user can determine when the pattern on the marker appears to be the same size as the pattern on the display (and therefore, the marker is positioned at the first longitudinal position), the user can indicate to the video headset that the marker is positioned at the first longitudinal position through a user interface on the video headset (such as by pressing a button, issuing a voice command, or other suitable indication), and the video headset can automatically measure the distance from the camera to the marker when the indication is received from the user. For these examples, determining that the marker is positioned at a first longitudinal position can include receiving notification from the user that the user perceives the marker in the field of view of the eye to have the same size as the pattern on the display in the field of view of the eye.

At operation 506, when the marker is positioned at the first longitudinal position, the video headset can measure a distance between a forward-facing camera on the video headset and the marker, such as quantity CM from FIG. 2. There are known algorithms in the field of homography that can measure a distance between a camera and an object in the field of view of the camera, for example, in the open-source computer library ARToolKit. Other suitable distance-measuring algorithms can also be used.

Figure 6:
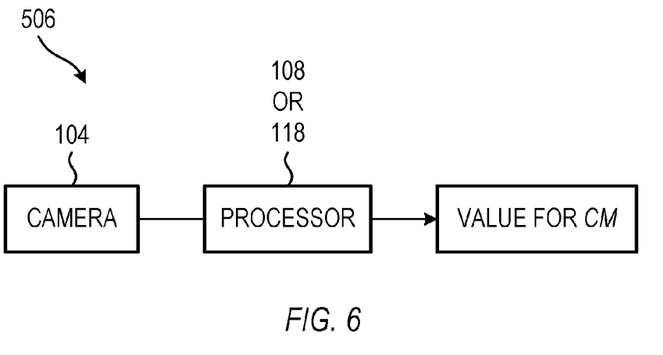
FIG. 6 shows an example of an implementation, in which a processor receives data from a camera and calculates a value for a spacing between the camera and the marker, in accordance with some embodiments.

FIG. 6 shows an example of an implementation for operation 506, in which processor 108 (integral with the video headset; FIG. 1) or 118 (connected via a network to the video headset; FIG. 1) receives data from the camera 104 and calculates a value for quantity CM, in accordance with some embodiments. Although the processor can perform some calculations to arrive at the quantity CM, the quantity CM is considered to be a measured quantity, which corresponds to a measured distance between the camera and the marker.

Returning to FIG. 5, at operation 508, the video headset can calculate, with a processor, a spacing between the eye and the display, such as quantity ID from FIG. 2, based in part on the measured distance.

Figure 7:
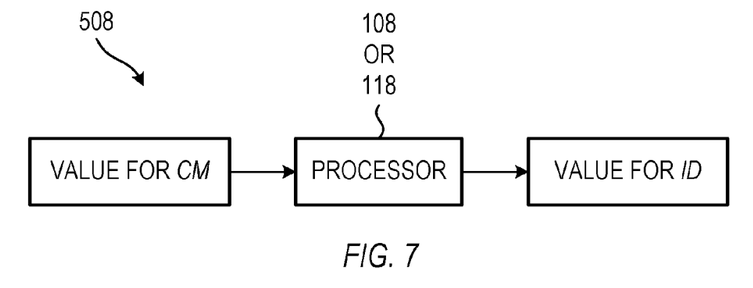
FIG. 7 shows an example of an implementation, in which a processor receives a value for the camera-to-marker spacing and calculates a value for a spacing between an iris of the eye and the display, in accordance with some embodiments.

FIG. 7 shows an example of an implementation for operation 508, in which processor 108 (integral with the video headset; FIG. 1) or 118 (connected via a network to the video headset; FIG. 1) receives the measured distance CM from operation 506 and calculates a value for quantity ID, in accordance with some embodiments.

In some examples, operation 508 can include receiving the measured distance CM between the forward-facing camera and the marker, and calculating, with the processor, the spacing ID between the eye and the display, based in part on the received measured distance CM, and using an expression based on a linear increase of the field of view of the eye, as a function of longitudinal distance from a fovea of the eye. Recall that FIG. 2 shows the field of view 104 increasing in size linearly as a function of distance away from the fovea 204.

Figure 8:
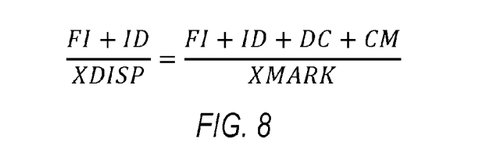
FIG. 8 shows an example of an equation relating the distances shown in FIG. 2 and the pattern sizes shown in FIGS. 3 and 4, in accordance with some embodiments.

FIG. 8 shows an equation relating the distances FI, ID, DC, and CM shown in FIG. 2 and the pattern sizes XDISP and XMARK shown in FIGS. 3 and 4, in accordance with some embodiments. The equation in FIG. 8 is based on a linear increase of the field of view of the eye, which relates the distances from FIG. 2 to the relative pattern sizes from FIGS. 3 and 4. The numerator of the left-hand side is the distance from the fovea to the display, and the denominator of the left-hand side is the relative size of the pattern at the display. Similarly, the numerator of the right-hand side is the distance from the fovea to the marker, and the denominator of the right-hand side is the relative size of the pattern at the marker.

Figure 9:
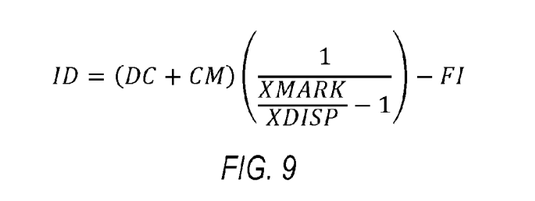
FIG. 9 shows the equation of FIG. 8 rearranged to solve for an iris-to-display distance, in accordance with some embodiments.

FIG. 9 shows the equation of FIG. 8 rearranged to solve for an iris-to-display distance ID, in accordance with some embodiments. In the expression of FIG. 9, FI is a longitudinal spacing between the fovea of the eye and an iris of the eye, ID is a longitudinal spacing between the iris of the eye and the display, DC is a longitudinal spacing between the display and the forward-facing camera, CM is the received measured distance, corresponding to a measured longitudinal spacing between the forward-facing camera and the marker when the pattern on the marker appears to be the same size as the pattern on the display in the field of view of the eye, XMARK is a relative size of the pattern on the marker; and XDISP is a relative size of the pattern on the display.

In some examples, spacing FI is selected to equal 24 mm, which corresponds to an average diameter of a human eyeball.

In some examples, spacing CM is selected to be less than 635 mm, which corresponds to an average human arm length.

In some examples, after the calibration has been performed and the iris-to-display distance ID has been determined, the processor can generate augmented reality content based on video data from the forward-facing camera on the video headset. Alternatively, after the calibration has been performed and the iris-to-display distance ID has been determined, the video headset can receive augmented reality content from a server based on video data from the forward-facing camera on the video headset. For each of these examples, the video headset can display the augmented reality content on the display based on the spacing between the eye and the display. The augmented reality content can be perceived at a predefined focal point based on the spacing between the eye and the display.

Example Machine Architecture and Machine-Readable Medium

Figure 10:
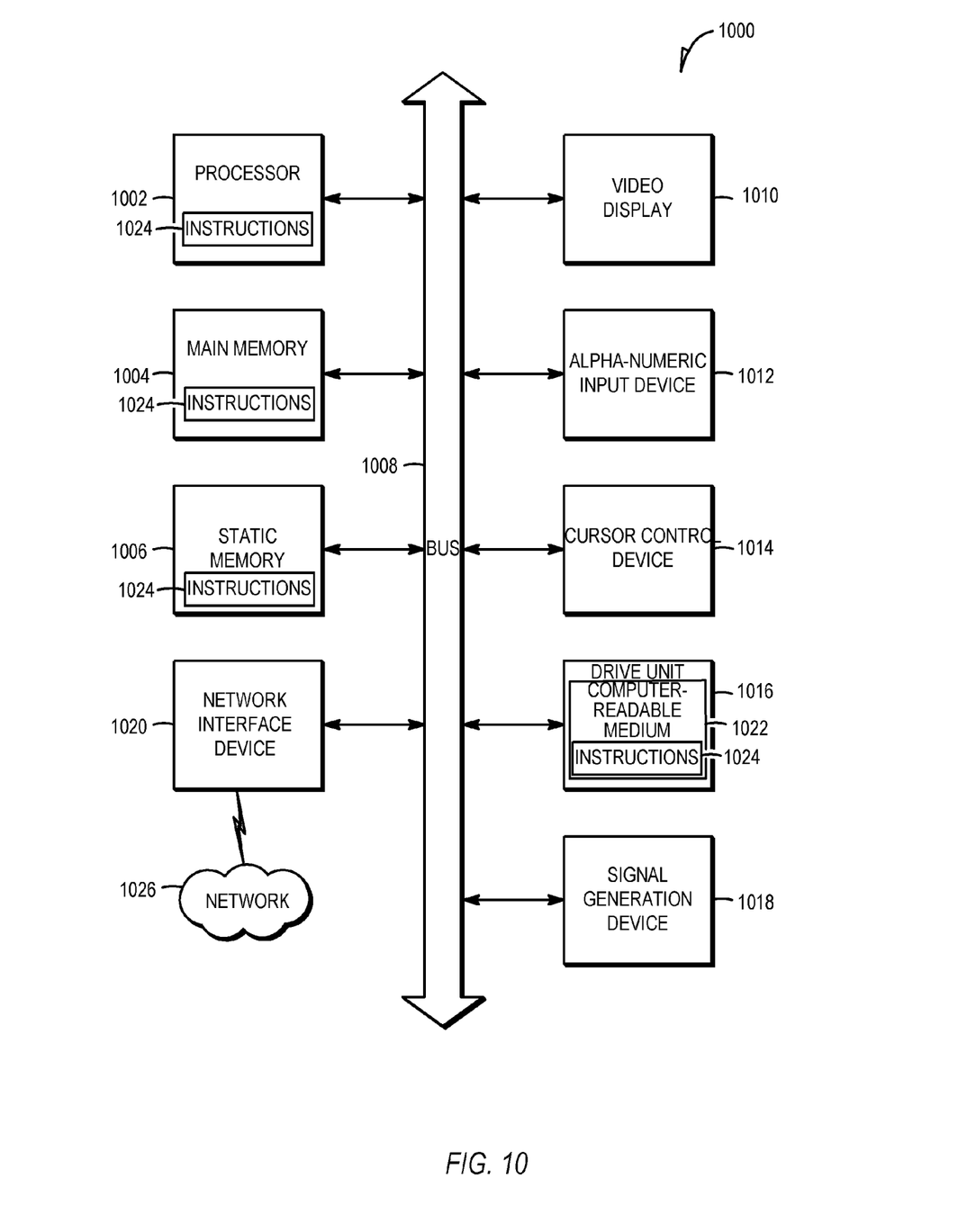
FIG. 10 is a block diagram illustrating components of a machine, according to some example embodiments, able to read instructions from a machine-readable medium and perform any one or more of the methodologies discussed herein.

FIG. 10 is a block diagram of a machine in the example form of a computer system 1000 within which instructions 1024 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server 116 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute a set (or multiple sets) of instructions 1024 to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a disk drive unit 1016, a signal generation device 1018 (e.g., a speaker) and a network interface device 1020.

Machine-Readable Medium

The disk drive unit 1016 includes a computer-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media 1022. The instructions 1024 may also reside, completely or at least partially, within the static memory 1006.

While the machine-readable medium 1022 is shown, in an example embodiment, to be a single medium, the term "machine-readable medium" may include a single medium or multiple media (e.g., a centralized or distributed database, and/or associated caches and servers 116) that store the one or more instructions 1024 or data structures. The term "machine-readable medium" shall also be taken to include any tangible medium that is capable of storing, encoding or carrying instructions 1024 for execution by the machine and that causes the machine to perform any one or more of the methodologies of the present embodiments, or that is capable of storing, encoding or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks 1026 include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 1024 for execution by the machine, and includes digital or analog communications signals or other intangible media to facilitate communication of such software.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an application-specific integrated circuit (ASIC). A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method for calibrating a video headset worn on a head of a user, the method comprising:

displaying a pattern on a display of the video headset, the display being at least partially transparent and positioned in a field of view of an eye of the user;

determining that a marker including a scaled version of the pattern is positioned in the field of view of the eye at a first longitudinal position away from the video headset, such that when the marker is positioned at the first longitudinal position, the pattern on the marker appears to be the same size as the pattern on the display in the field of view of the eye;

when the marker is positioned at the first longitudinal position, measuring a distance between a forward-facing camera on the video headset and the marker; and calculating, with a processor, a spacing between the eye and the display, based in part on the measured distance;

wherein calculating the spacing between the eye and the display comprises:

receiving the measured distance between the forward-facing camera and the marker; and calculating, with the processor, the spacing between the eye and the display, based in part on the received measured distance, and using an expression based on a linear increase of the field of view of the eye, as a function of longitudinal distance, from a fovea of the eye;

wherein:

the expression comprises $$ID = (DC + CM)\left(\frac{1}{\frac{XMARK}{XDISP} - 1}\right) - FI;$$

FI is a longitudinal spacing between the fovea of the eye and an iris of the eye;

ID is a longitudinal spacing between the iris of the eye and the display;

DC is a longitudinal spacing between the display and the forward-facing camera;

CM is the received measured distance, corresponding to a measured longitudinal spacing between the forward-facing camera and the marker when the pattern on the marker appears to be the same size as the pattern on the display in the field of view of the eye;

XMARK is a relative size of the pattern on the marker along one lateral dimension; and XDISP is a relative size of the pattern on the display along the same lateral dimension.

2. The method of claim 1, wherein spacing FI is selected to equal 24 mm, which corresponds to an average diameter of a human eyeball.

3. The method of claim 1, wherein spacing CM is selected to be less than 635 mm, whereby 635 mm corresponds to an average human arm length.

4. The method of claim 1, wherein determining that the marker is positioned at a first longitudinal position comprises:

automatically sensing with the forward-facing camera that the pattern on the marker in the field of view of the eye is sized to match the pattern on the display in the field of view of the eye to within a specified threshold.

5. The method of claim 1, wherein determining that the marker is positioned at a first longitudinal position comprises:

receiving notification from the user that the user perceives the marker in the field of view of the eye to have the same size as the pattern on the display in the field of view of the eye.

6. The method of claim 1, wherein the pattern is a two-dimensional pattern on a surface normal to an axis along the field of view of the eye.

7. The method of claim 6, wherein the pattern includes at least one two-dimensional fiducial marker.

8. The method of claim 1, further comprising:
generating, using the processor, augmented reality content based on video data from the forward-facing camera on the video headset; and
displaying the augmented reality content in the display based on the spacing between the eye and the display, the augmented reality content perceived at a predefined focal point based on the spacing between the eye and the display.

9. The method of claim 1, further comprising:
receiving augmented reality content from a server based on video data from the forward-facing camera on the video headset; and
displaying the augmented reality content in the display based on the spacing between the eye and the display, the augmented reality content perceived at a predefined focal point based on the spacing between the eye and the display.

10. A video headset wearable on a head of a user, comprising:
a display being at least partially transparent and positioned in a field of view of an eye of the user;
a processor; and
memory including instructions that, when executed on the processor, cause the processor to perform operations, the operations comprising:
displaying a pattern on the display;
determining that a marker including a scaled version of the pattern is positioned in the field of view of the eye at a first longitudinal position away from the video headset, such that when the marker is positioned at the first longitudinal position, the pattern on the marker appears to be the same size as the pattern on the display in the field of view of the eye;
when the marker is positioned at the first longitudinal position, measuring a distance between a forward-facing camera on the video headset and the marker; and
calculating, with the processor, a spacing between the eye and the display, based in part on the measured distance;
wherein calculating the spacing between the eye and the display comprises:
receiving the measured distance between the forward-facing camera and the marker; and
calculating, with the processor, the spacing between the eye and the display, based in part on the received measured distance, and using an expression based on a linear increase of the field of view of the eye, as a function of longitudinal distance, from a fovea of the eye;
wherein:
the expression comprises $$ID = (DC + CM)\left(\frac{1}{\frac{XMARK}{XDISP} - 1}\right) - FI;$$

FI is a longitudinal spacing between the fovea of the eye and an iris of the eye;
ID is a longitudinal spacing between the iris of the eye and the display;
DC is a longitudinal spacing between the display and the forward-facing camera;
CM is the received measured distance, corresponding to a measured longitudinal spacing between the forward-facing camera and the marker when the pattern on the marker appears to be the same size as the pattern on the display in the field of view of the eye;
XMARK is a relative size of the pattern on the marker along one lateral dimension; and
XDISP is a relative size of the pattern on the display along the same lateral dimension.

11. The video headset of claim 10, wherein:
spacing FI is selected to equal 24 mm, which corresponds to an average diameter of a human eyeball; and
spacing CM is selected to be less than 635 mm, whereby 635 mm corresponds to an average human arm length.

12. The video headset of claim 10, wherein determining that the marker is positioned at a first longitudinal position comprises:
automatically sensing with the forward-facing camera that the pattern on the marker in the field of view of the eye is sized to match the pattern on the display in the field of view of the eye to within a specified threshold.

13. The video headset of claim 10, wherein determining that the marker is positioned at a first longitudinal position comprises:
receiving notification from the user that the user perceives the marker in the field of view of the eye to have the same size as the pattern on the display in the field of view of the eye.

14. The video headset of claim 10, wherein the pattern includes at least one two-dimensional fiducial marker.

15. A method for calibrating a video headset worn on a head of a user, the method comprising:
displaying a pattern on a display of the video headset, the display being at least partially transparent and positioned in a field of view of an eye of the user;
determining that a marker including a scaled version of the pattern is positioned in the field of view of the eye at a first longitudinal position away from the video headset, such that when the marker is positioned at the first longitudinal position, the pattern on the marker appears to be the same size as the pattern on the display in the field of view of the eye;
when the marker is positioned at the first longitudinal position, measuring a distance between a forward-facing camera on the video headset and the marker; and
calculating, with a processor, a spacing between the eye and the display, based in part on an expression comprising $$ID = (DC + CM)\left(\frac{1}{\frac{XMARK}{XDISP} - 1}\right) - FI;$$

wherein:
FI is a longitudinal spacing between the fovea of the eye and an iris of the eye;
ID is a longitudinal spacing between the iris of the eye and the display;

DC is a longitudinal spacing between the display and the forward-facing camera;

CM is the received measured distance, corresponding to a measured longitudinal spacing between the forward-facing camera and the marker when the pattern on the marker appears to be the same size as the pattern on the display in the field of view of the eye;

XMARK is a relative size of the pattern on the marker along one lateral dimension; and XDISP is a relative size of the pattern on the display along the same lateral dimension.

16. The method of claim 15, wherein:

spacing FI is selected to equal 24 mm, which corresponds to an average diameter of a human eyeball; and spacing CM is selected to be less than 635 mm, whereby 635 mm corresponds to an average human arm length.

\* \* \* \* \*